United States Patent [19]
Ogawa

[11] Patent Number: 5,930,043
[45] Date of Patent: Jul. 27, 1999

[54] OPTICAL SYSTEM WITH REFRACTING AND DIFFRACTING OPTICAL UNITS, AND OPTICAL INSTRUMENT INCLUDING THE OPTICAL SYSTEM

[75] Inventor: Hideki Ogawa, Yokohama, Japan

[73] Assignee: Canon Kabushiki Kaisha, Tokyo, Japan

[21] Appl. No.: 08/944,644

[22] Filed: Oct. 6, 1997

[30] Foreign Application Priority Data

Oct. 8, 1996 [JP] Japan .................................... 8-267123
Sep. 10, 1997 [JP] Japan .................................... 9-245315

[51] Int. Cl.⁶ ........................................................ G02B 3/08
[52] U.S. Cl. ............................ 359/566; 359/565; 359/742
[58] Field of Search .................................... 359/558, 565, 359/566, 569, 740, 742, 576, 642

[56] References Cited

U.S. PATENT DOCUMENTS

| | | | |
|---|---|---|---|
| 5,042,927 | 8/1991 | Ogawa et al. | 359/683 |
| 5,241,421 | 8/1993 | Endo et al. | 359/684 |
| 5,268,790 | 12/1993 | Chen | 359/558 |
| 5,528,427 | 6/1996 | Tanaka et al. | 359/683 |
| 5,537,259 | 7/1996 | Ogawa | 359/684 |
| 5,568,321 | 10/1996 | Ogawa et al. | 359/676 |
| 5,576,890 | 11/1996 | Tanaka et al. | 359/686 |
| 5,790,321 | 8/1998 | Goto | 359/742 |

FOREIGN PATENT DOCUMENTS 6-324262 11/1994 Japan .

Primary Examiner—Cassandra Spyrou
Attorney, Agent, or Firm—Fitzpatrick, Cella, Harper & Scinto

[57] ABSTRACT

A new optical system capable of correcting aberrations well by using a refracting optical element and a diffracting optical element in combination, and of increasing the aperture and the field angle. The optical system includes a first refracting optical unit placed on the object side with respect to a stop, a diffracting optical unit placed adjacent the stop to correct chromatic aberration, and a second refracting optical unit placed on the image side with respect to the stop. The first and second refracting optical units are substantially symmetrical with respect to the stop.

20 Claims, 17 Drawing Sheets

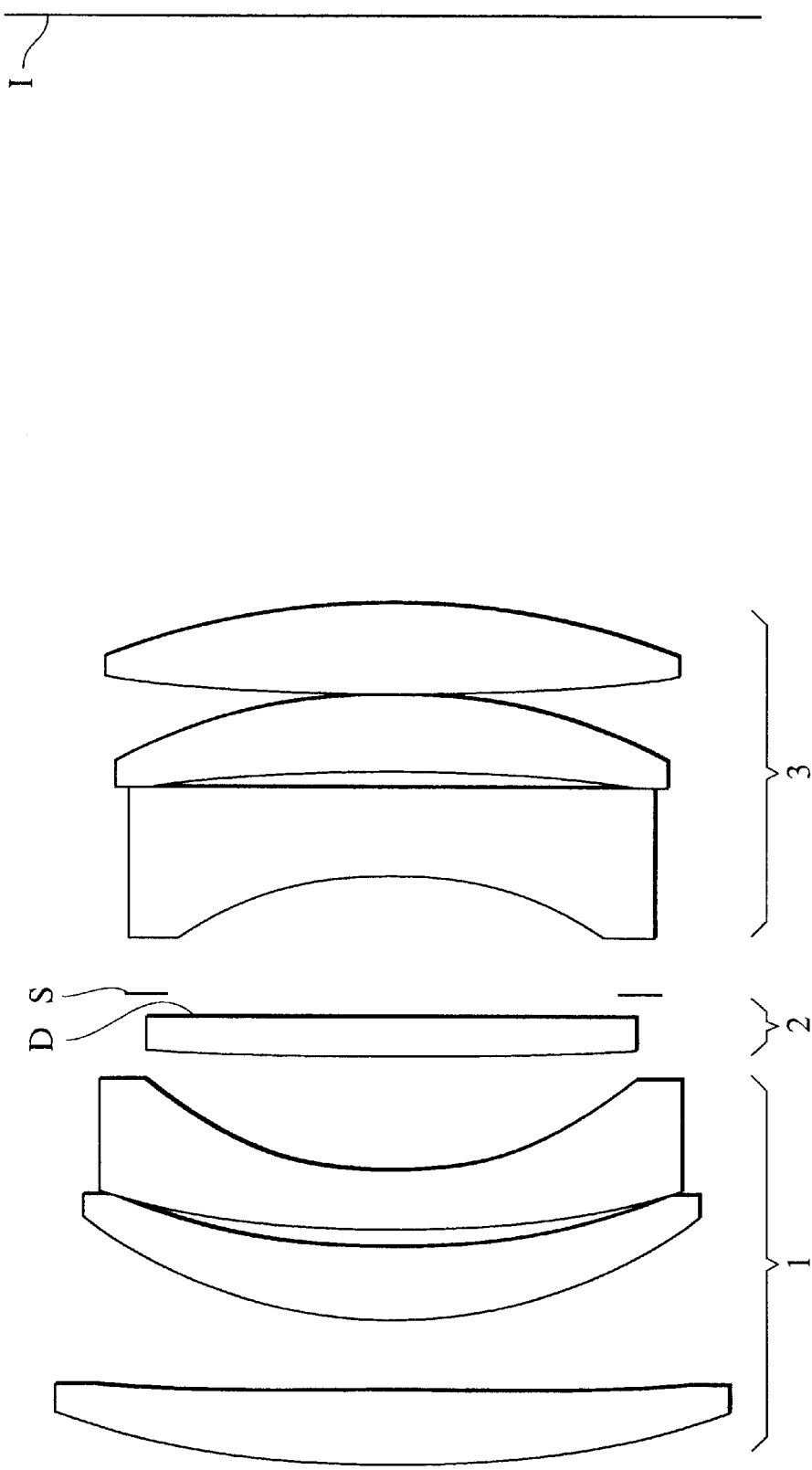

MERIDIONAL ABERRATION | SAGITTAL ABERRATION

------------------ c RAY
———————— d RAY
—·—·—·— F RAY
---------- g RAY

MERIDIONAL ABERRATION | SAGITTAL ABERRATION

·········· c RAY
———— d RAY
—·—·—· F RAY
-------- g RAY

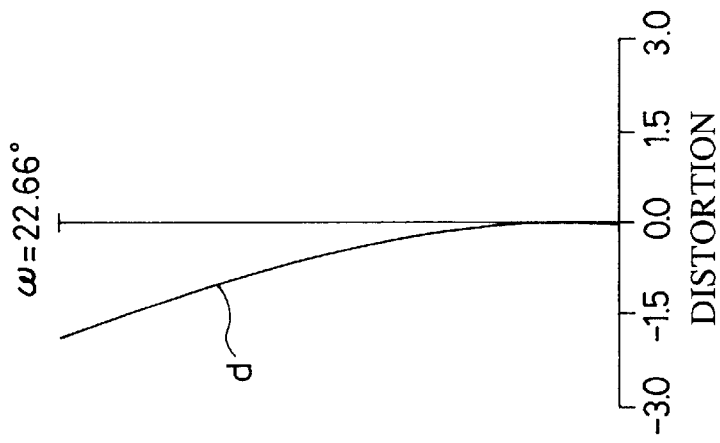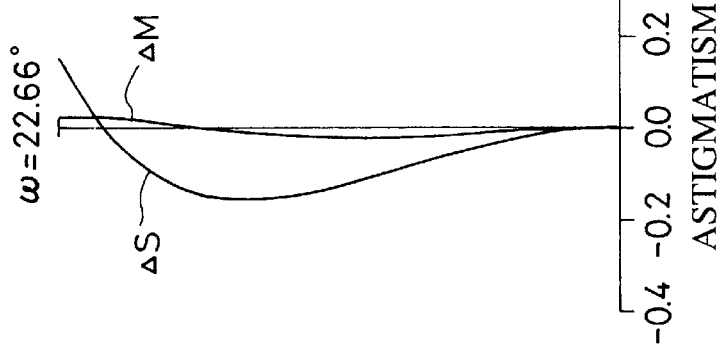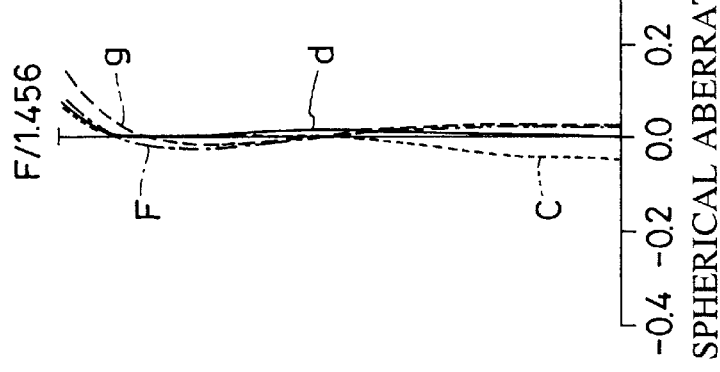

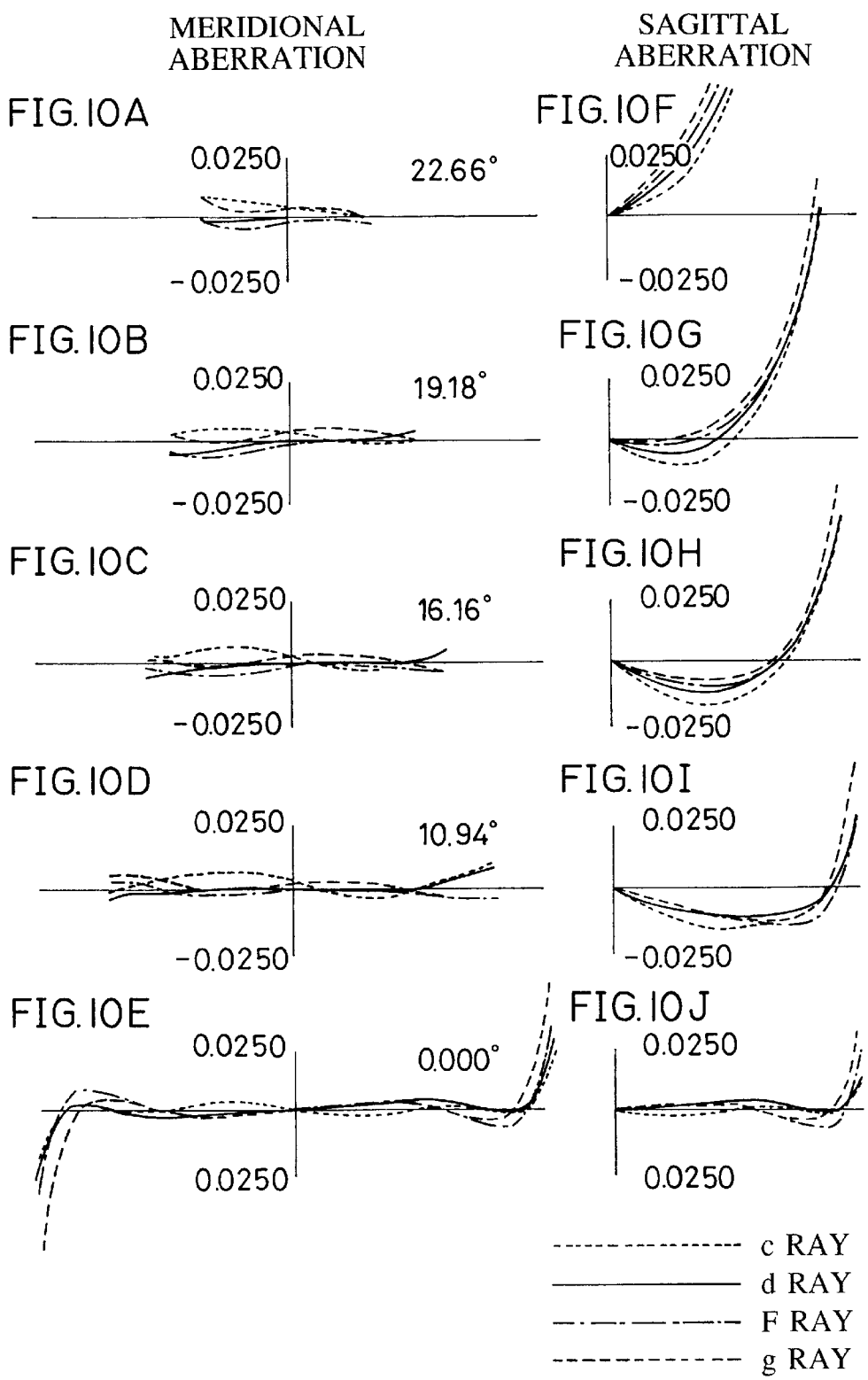

MERIDIONAL ABERRATION | SAGITTAL ABERRATION

------------ c RAY
———————— d RAY
—·—·—·— F RAY
---------- g RAY

OPTICAL SYSTEM WITH REFRACTING AND DIFFRACTING OPTICAL UNITS, AND OPTICAL INSTRUMENT INCLUDING THE OPTICAL SYSTEM

BACKGROUND OF THE INVENTION

1. Field of the Invention

The present invention relates to an optical system, and more particularly, to an optical system corrected for aberrations, which is suitable for use in an objective lens of a 35 mm single-lens reflex camera, an electronic still camera, a video camera or the like.

2. Description of the Related Art

In a popular type of objective lens, sufficient performance cannot be obtained unless not only spherical aberration, coma and astigmatism, but also axial chromatic aberration and chromatic aberration of magnification are corrected well.

In conventional aberration correction using only a refracting optical element, chromatic aberration is almost always determined in a relatively early design stage in which the power and the material of the refracting optical element are determined. For example, axial chromatic aberration is overcorrected in the short wavelength region of the visible range, insufficiently corrected in the intermediate region, and overcorrected again in the long wavelength region, that is, the axial chromatic aberration has a tendency of what is called achromat.

As a well-known method of correcting axial chromatic aberration with respect to a wide range of wavelengths, fluorite or the like, which has a low refractive index and a low dispersive power and which is anomalously dispersive, is used in a convex lens, whereby residual chromatic aberration is corrected relatively well. However, such an anomalous dispersion glass is extremely expensive.

Furthermore, since the above-discussed glass has a relatively low refractive index of about 1.5, the use thereof in optical systems other than an optical system having a longer focal length than a medium-telephoto system, in which the amount of change in the field angle owing to aberration is small, makes it extremely difficult to keep aberrations in balance.

For example, in the case in which this glass material having low refractive index is used in a Gaussian optical system, which is often used as a standard lens for a 35 mm single-lens reflex camera, spherical aberration, astigmatism and field curvature cannot be kept in balance, and, in particular, spherical aberration becomes worse in the third-order region and the high-order region. Although spherical aberration in the high-order region can be reduced to zero by balancing the third-order spherical aberration coefficients and the high-order spherical aberration coefficients, since it is difficult to decrease the absolute values of the third-order and high-order spherical aberration coefficients, zonal spherical aberration remains, as it is not corrected sufficiently. This problem can be solved by using an anomalous dispersion material having a high refractive index and a high dispersive power, but, regrettably, such a material does not exist.

In order to correct axial chromatic aberration for a wide range of wavelengths without using an anomalous dispersion glass such as fluorite, as is well known, a refracting optical element and a diffracting optical element are used in combination. Since the diffracting optical element has a negative Abbe number, it can correct chromatic aberration well in combination with the refracting optical element.

Japanese Laid-Open Patent Application No. 6-324262 discloses a typical photographic optical system which corrects chromatic aberration by using a refracting optical element and a diffracting optical element in combination.

In this publication, a diffracting optical element is placed in a telephoto optical system having a field angle of about 14° (the focal length thereof is about 180 mm in a 35 mm single-lens reflex camera), thereby correcting axial chromatic aberration.

As a medium-telephoto lens in which the change in field angle owing to aberration is small, this optical system is corrected relatively well for aberrations including axial chromatic aberration. However, the F-number thereof is about 2.8, that is, the brightness is low. It is impossible to increase the aperture so that the F-number is about 1.4 and to obtain a wide field angle without changing the lens layout.

SUMMARY OF THE INVENTION

Accordingly, an object of the present invention is to provide a new optical system which is capable of correcting aberrations by using a refracting optical element and a diffracting optical element in combination, and of increasing the aperture and the field angle.

In view of the foregoing, in one aspect, the present invention relates to an optical system having a stop, the optical system comprising a first refracting optical unit placed on the object side with respect to the stop, a diffracting optical unit placed adjacent the stop to correct chromatic aberration, and a second refracting optical unit placed on the image side with respect to the stop, wherein the first refracting optical unit and the second refracting optical unit are substantially symmetrical with respect to the stop.

In another aspect, the present invention relates to an optical system having a stop, the optical system comprising a refracting optical unit placed on the object side with respect to the stop, a diffracting optical unit placed adjacent the stop to correct chromatic aberration, and a reflecting optical unit disposed on the image side of the diffracting optical unit, wherein light from the object travels through the refracting optical unit, the diffracting optical unit, the reflecting optical unit, and the refracting optical unit again, in this order.

In yet another aspect, the present invention relates to an optical system comprising a refracting optical unit, a stop, and an optical unit having a diffracting optical plane on the image side surface thereof and a reflecting optical plane on the object side surface thereof, wherein light from an object passes, in order, through the refracting optical unit, the stop, and the diffracting optical plane, and is reflected by the reflecting optical plane back through the diffracting optical plane, the stop, and the refracting optical unit, in that order.

In still yet another aspect, the present invention relates to an optical instrument comprising (a) an objective optical system, the objective optical system including a stop, a first refracting optical unit placed on the object side with respect to the stop, a diffracting optical unit placed adjacent the stop to correct chromatic aberration, and a second refracting optical unit placed on the image side with respect to the stop, wherein the first and second refracting optical units are substantially symmetrical with respect to the stop, and (b) an observation optical system for guiding light, taken from the object by the objective optical system, to be observed.

These and other aspects, objects, and features of the present invention will become apparent from the following detailed description of preferred embodiments thereof taken in connection with the accompanying drawings.

BRIEF DESCRIPTION OF THE DRAWINGS

FIG. 4 is a cross-sectional view of an optical system corresponding to Numerical Example 4 of the invention.

FIGS. 9A, 9B, and 9C are aberration curves of the optical system corresponding to Numerical Example 3.

FIGS. 10A, 10B, 10C, 10D, 10E, 10F, 10G, 10H, 10I, and 10J are aberration curves of the optical system corresponding to Numerical Example 3.

DESCRIPTION OF THE PREFERRED EMBODIMENTS

FIGS. 1 to 4 are cross-sectional views of optical systems corresponding to Numerical Examples 1 to 4 of the present invention. FIGS. 5A through 5C and 6A through 6J are aberration curves of the optical system corresponding to Numerical Example 1, FIGS. 7A through 7C and 8A through 8J are aberration curves of the optical system corresponding to Numerical Example 2, FIGS. 9A through 9C and 10A through 10J are aberration curves of the optical system corresponding to Numerical Example 3, and FIGS. 11A through 11C and 12A through 12J are aberration curves of the optical system corresponding to Numerical Example 4.

In the diagrams (i.e., FIGS. 5A through 12J), d stands for the spectral d-line, g for the spectral g-line, F for the spectral F-line, C for the spectral C-line, ΔM for the change in meridional image focus, and ΔS for the change in sagittal image focus.

In these figures, the optical systems each comprise a first unit (first refracting optical unit) 1 composed of a refracting optical element, a second unit (diffracting optical unit) 2 composed of a diffracting optical element, and a third unit (second refracting optical unit) 3 composed of a refracting optical element. D, S and I represent a diffracting optical plane included in the second unit, a stop and an image plane, respectively.

The diffracting optical plane D is formed by a ring-shaped diffraction grating which is rotationally symmetrical with respect to the optical axis, and a phase φ (h) thereof is given by the following formula:

$$\phi(h)=(2\pi/\gamma)(C1 \cdot h^2+C2 \cdot h^4+C3 \cdot h^6+ \ldots +Ci \cdot h^{2i}) \quad (1)$$

where γ represents the wavelength, Ci represents the aspherical phase coefficient, and h represents the height from the optical axis.

Figure 1:
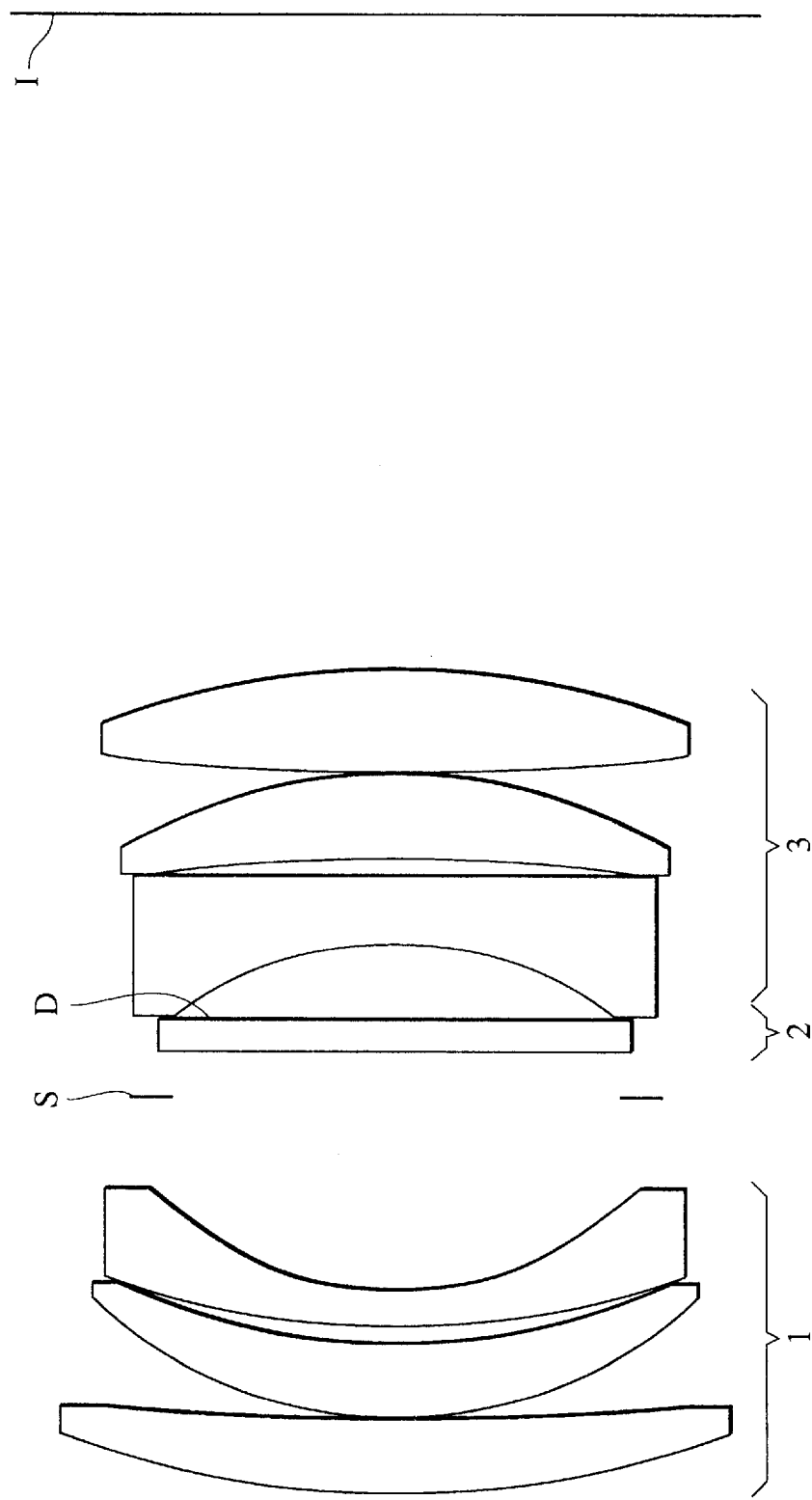
FIG. 1 is a cross-sectional view of an optical system corresponding to Numerical Example 1 of the invention.
Figure 2:
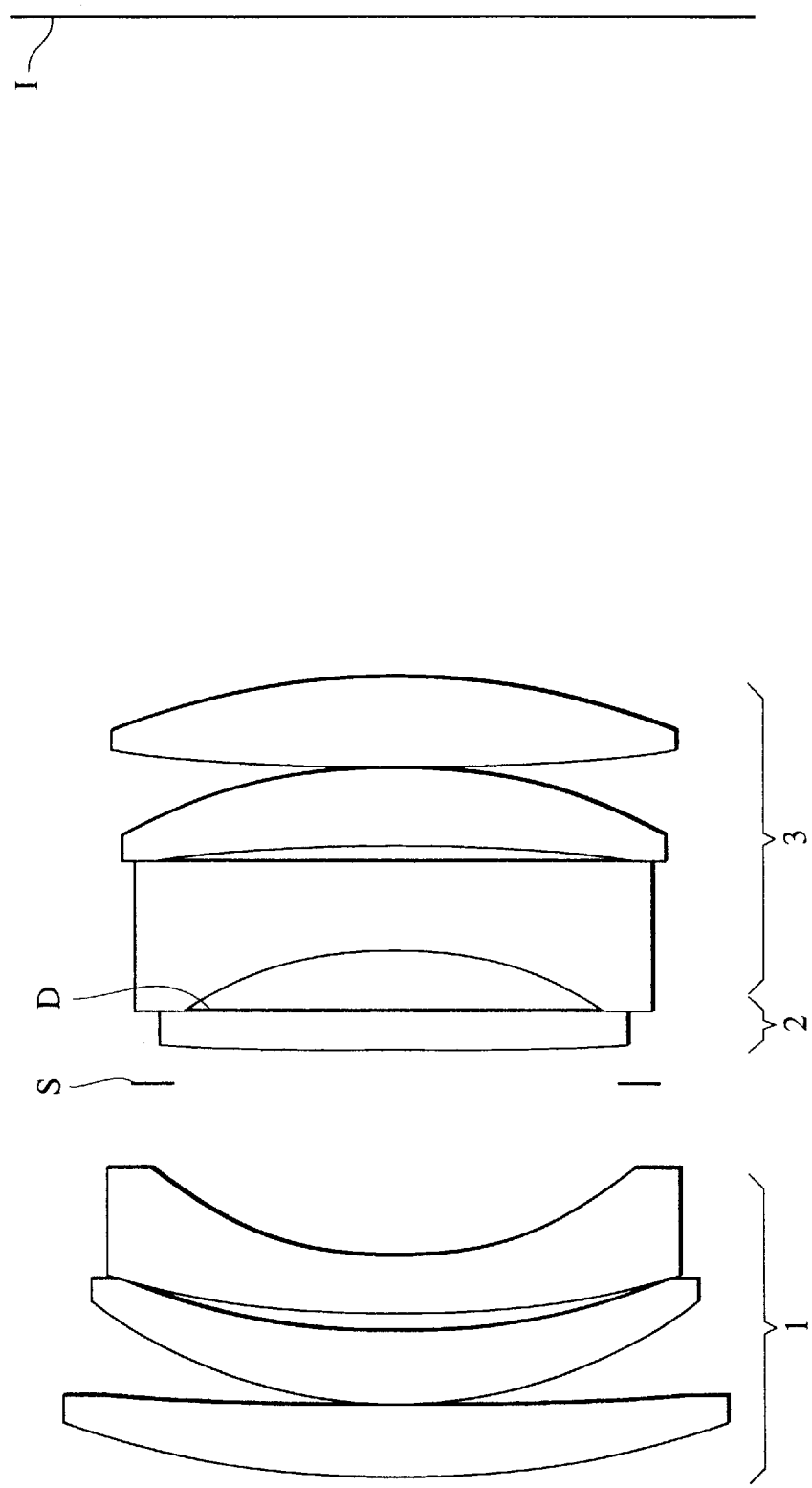
FIG. 2 is a cross-sectional view of an optical system corresponding to Numerical Example 2 of the invention.
Figure 3:
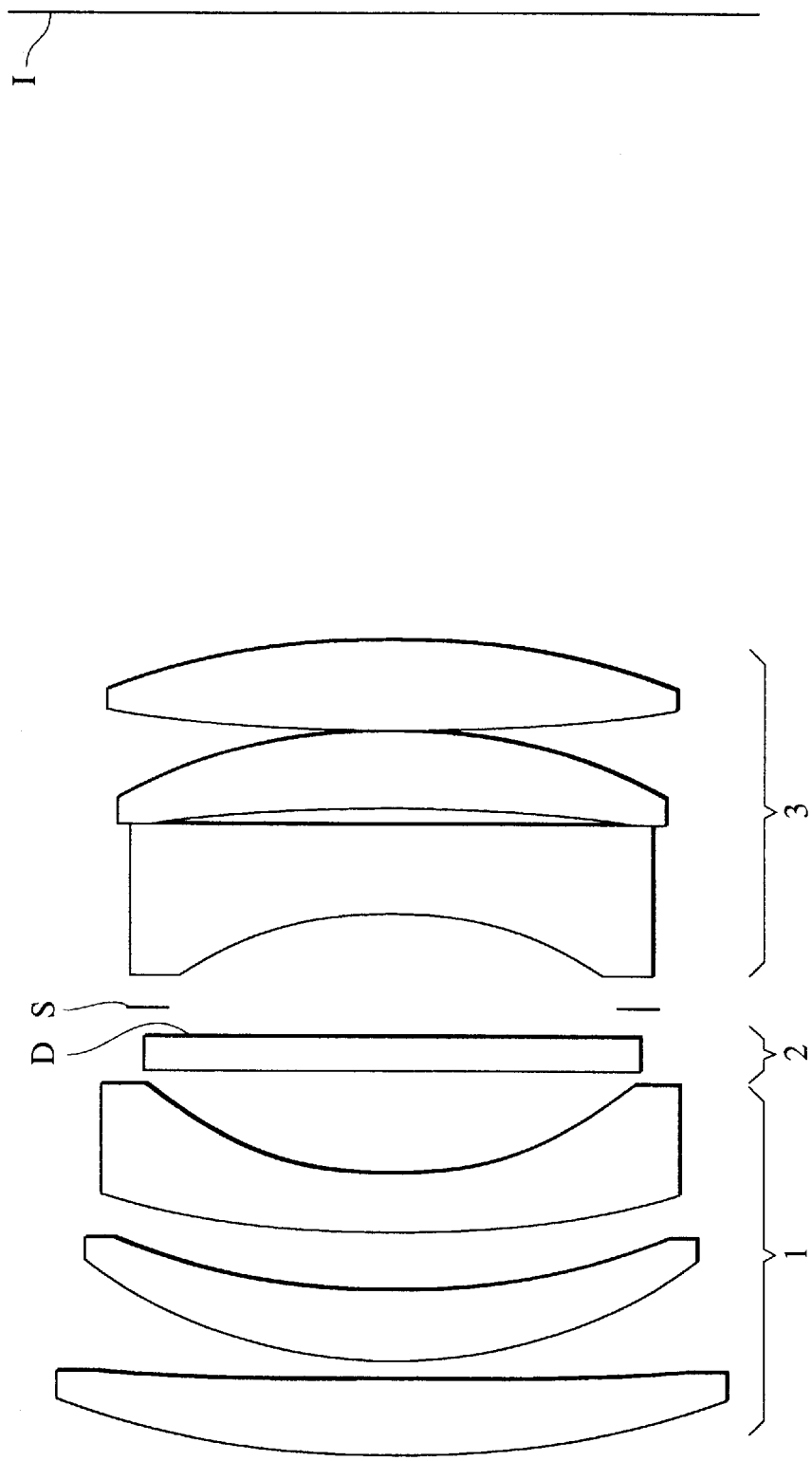
FIG. 3 is a cross-sectional view of an optical system corresponding to Numerical Example 3 of the invention.
Figure 5C:
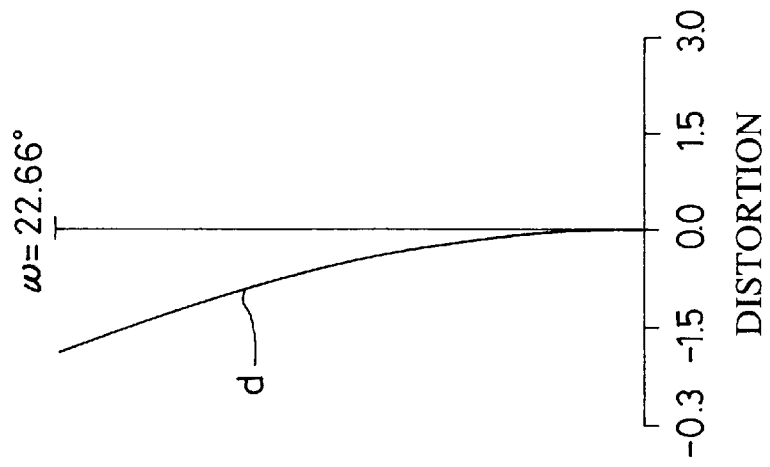
FIGS. 5A, 5B, and 5C are aberration curves of the optical system corresponding to Numerical Example 1.
Figure 5B:
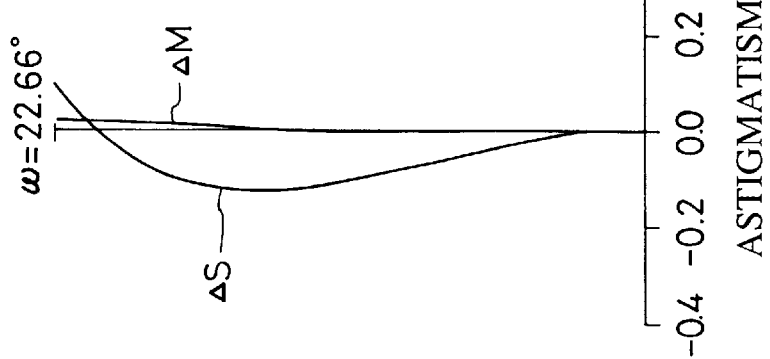
Figure 5A:
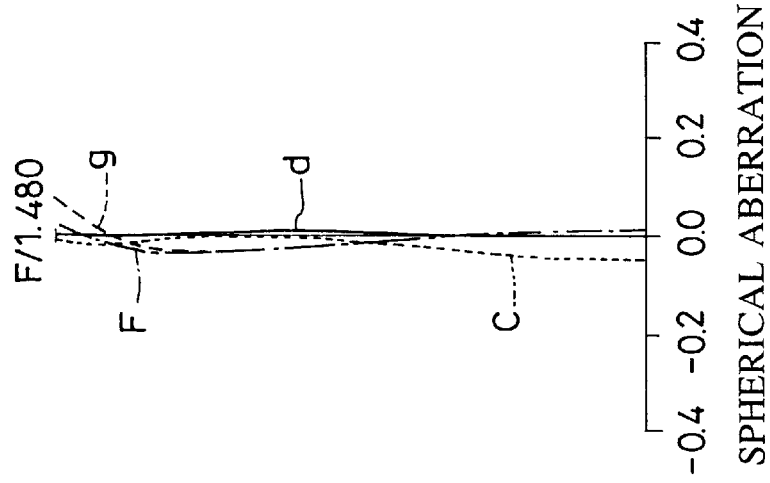
Figure 6A:
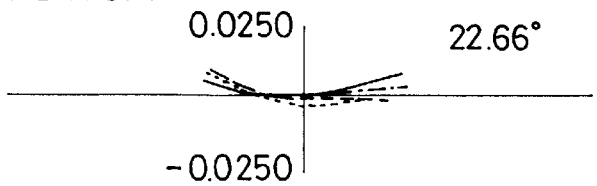
FIGS. 6A, 6B, 6C, 6D, 6E, 6F, 6G, 6H, 6I, and 6J are aberration curves of the optical system corresponding to Numerical Example 1.
Figure 6F:
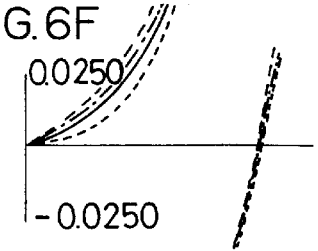
Figure 6B:
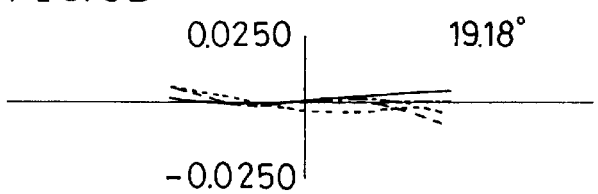
Figure 6G:
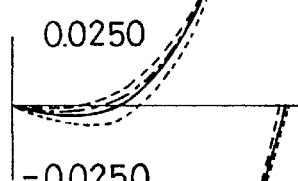
Figure 6C:
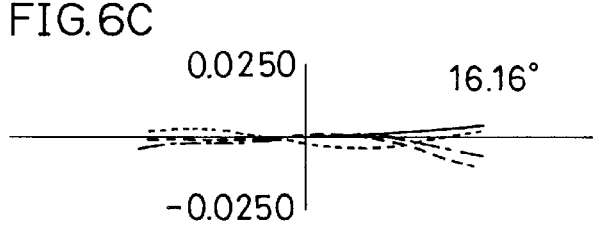
Figure 6H:
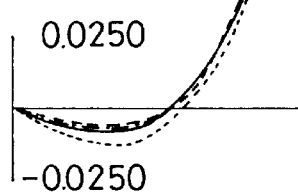
Figure 6D:
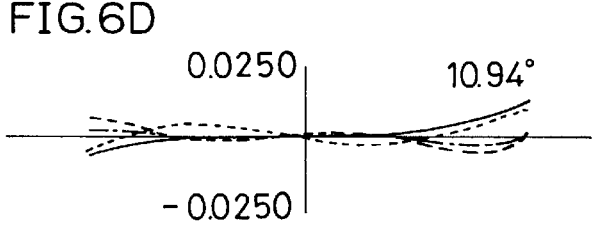
Figure 6I:
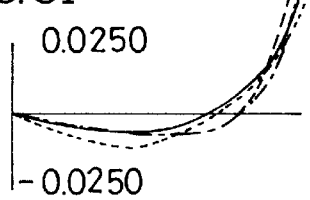
Figure 6E:
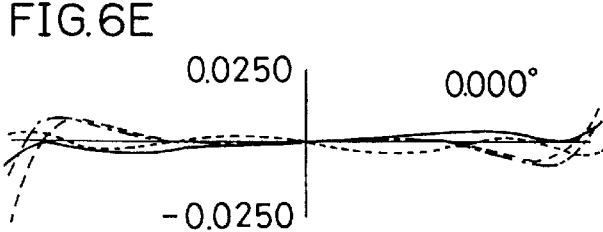
Figure 6J:
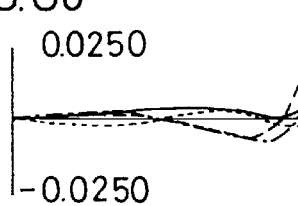
Figure 7A:
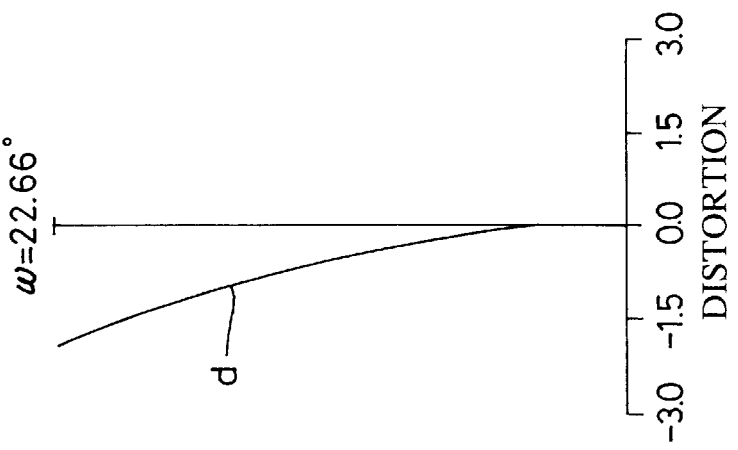
FIGS. 7A, 7B, and 7C are aberration curves of the optical system corresponding to Numerical Example 2.
Figure 7B:
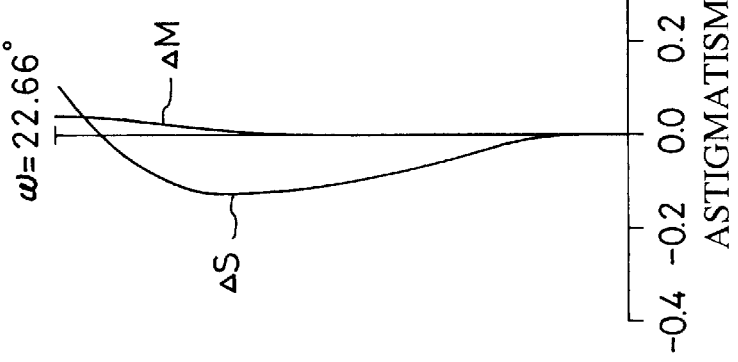
Figure 7C:
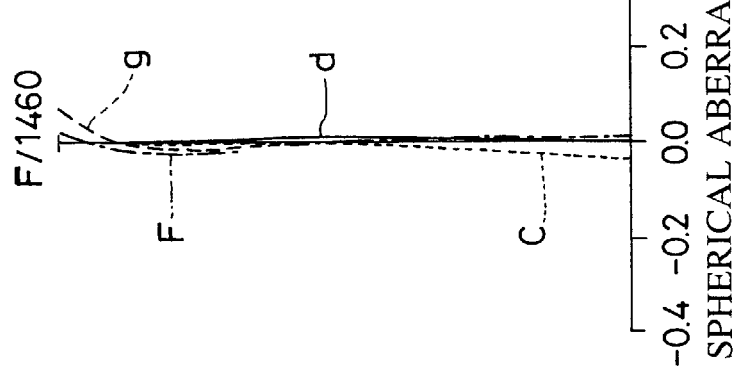
Figure 8A:
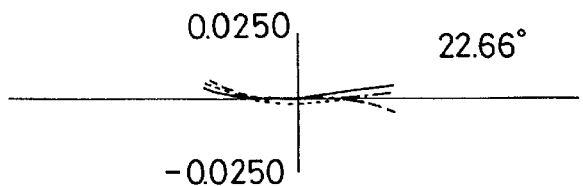
FIGS. 8A, 8B, 8C, 8D, 8E, 8F, 8G, 8H, 8I, and 8J are aberration curves of the optical system corresponding to Numerical Example 2.
Figure 8F:
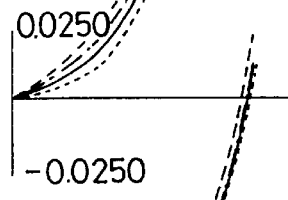
Figure 8B:
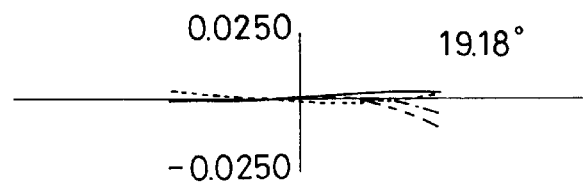
Figure 8G:
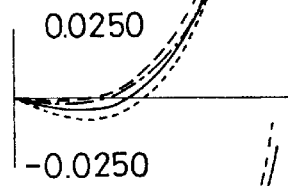
Figure 8C:
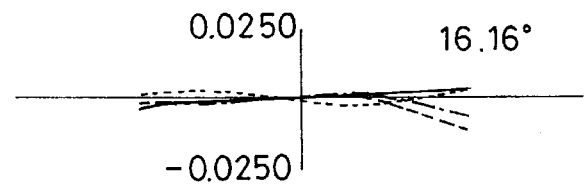
Figure 8H:
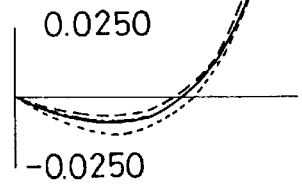
Figure 8D:
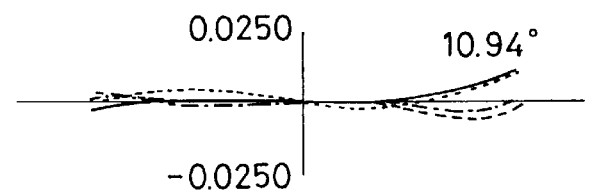
Figure 8I:
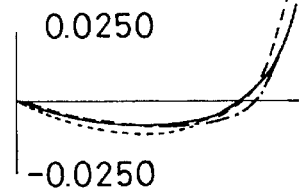
Figure 8E:
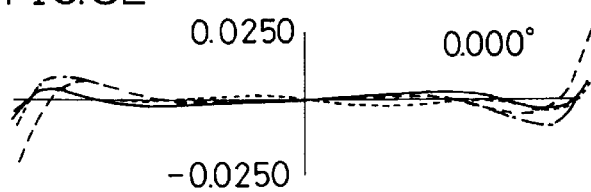
Figure 8J:
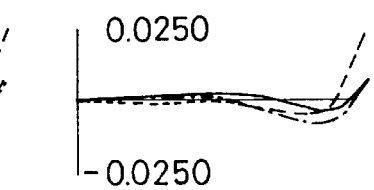
Figure 11C:
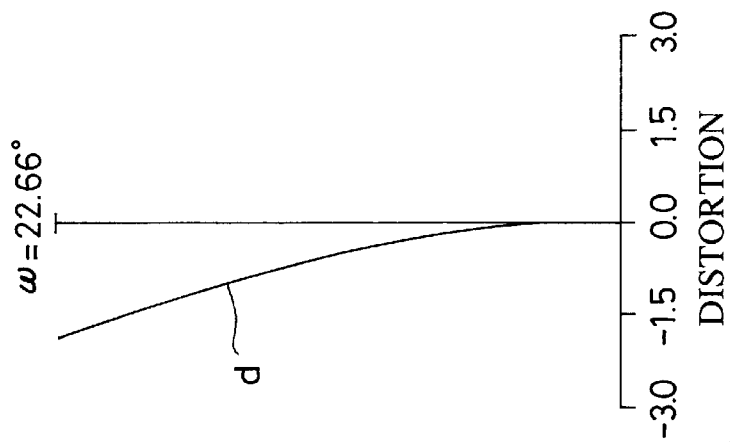
FIGS. 11A, 11B, and 11C are aberration curves of the optical system corresponding to Numerical Example 4.
Figure 11B:
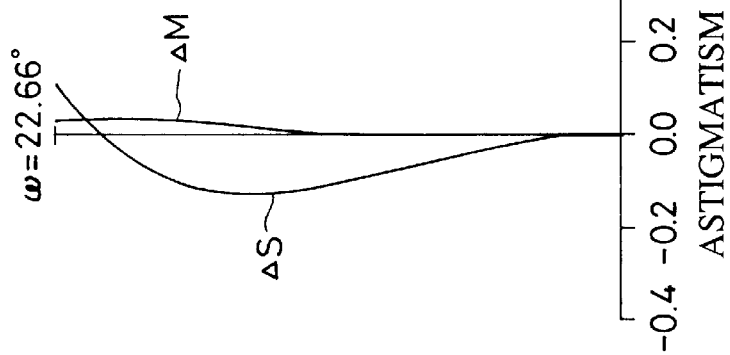
Figure 11A:
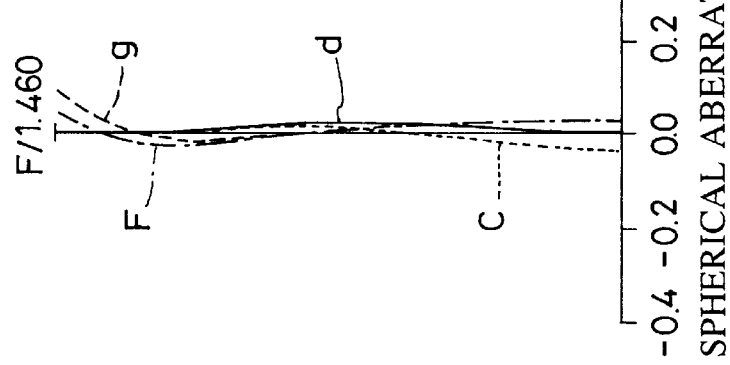
Figure 12A:
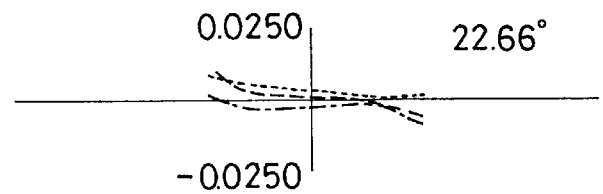
FIGS. 12A, 12B, 12C, 12D, 12E, 12F, 12G, 12H, 12I, and 12J are aberration curves of the optical system corresponding to Numerical Example 4.
Figure 12F:
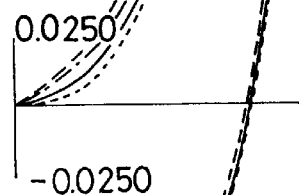
Figure 12B:
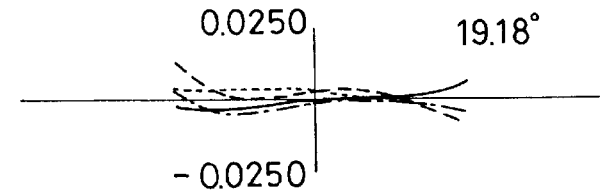
Figure 12G:
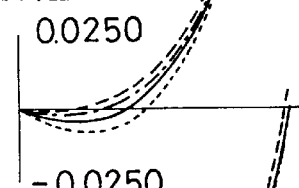
Figure 12C:
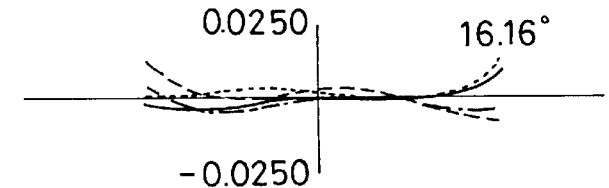
Figure 12H:
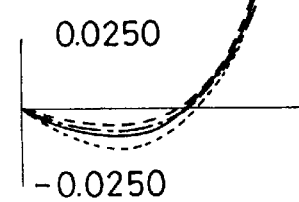
Figure 12D:
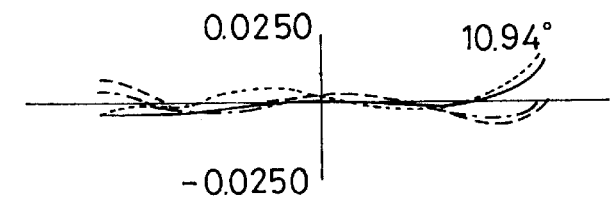
Figure 12I:
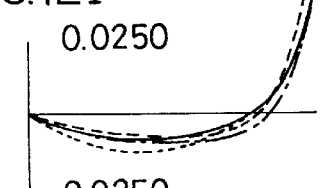
Figure 12E:
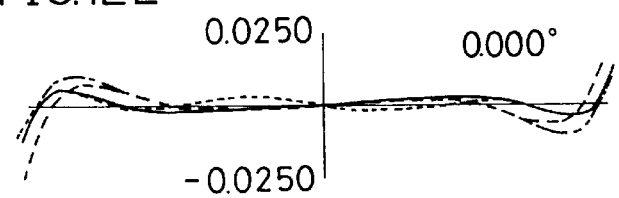
Figure 12J:
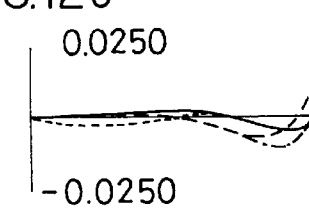

Preferably, the first and second units are substantially symmetrical with respect to the stop. For example, as shown in FIG. 1, the first and second units are substantially symmetrical with respect to the stop because the first and second units each comprise, in order from the stop side, a negative meniscus lens having a concave faced toward the stop, a positive meniscus lens having a concave faced toward the stop and a positive lens, and the negative meniscus lenses, the positive meniscus lenses and the positive lenses therein are respectively placed almost symmetrically with respect to the stop.

Furthermore, each of the first and second units preferably comprises at least one positive lens and at least one negative lens. Preferably, the negative lens is placed at a closer position to the stop than the positive lens, and has a strong concave plane or surface pointed toward the stop, i.e., a surface which is stronger than an opposite surface of the lens.

In addition, the diffracting optical unit preferably includes a diffracting optical plane having a lower refractive power than a refractive power of the entire optical system.

The numerical examples will be described below. In the numerical examples, ri represents the radius of curvature of the i-th lens plane, di represents the i-th thickness or air space, and ni and υi respectively represent the refractive index and the Abbe number of the i-th lens or the diffracting optical element. In the above formula (1), γ is set at 587.6 nm (d ray).

[Numerical Example 1]

| f = 51.750 | $F_{NO}$ = 1.460 | 2ω = 45.32° | |
|---|---|---|---|
| r1 = 56.883 | d1 = 4.18 | n1 = 1.83481 | υ1 = 42.7 |
| r2 = 307.761 | d2 = 0.15 | | |
| r3 = 26.369 | d3 = 3.99 | n2 = 1.88300 | υ2 = 40.8 |

-continued

| | | | |
|---|---|---|---|
| r4 = 38.940 | d4 = 1.06 | | |
| r5 = 53.377 | d5 = 1.93 | n3 = 1.67270 | v3 = 32.1 |
| r6 = 19.976 | d6 = 11.06 | | |
| r7 = 0.000 (stop) | d7 = 2.56 | | |
| r8 = 0.000 | d8 = 1.80 | n4 = 1.51633 | v4 = 64.2 |
| r9 = 0.000 (diffracting plane) | d9 = 4.27 | | |
| r10 = −21.747 | d10 = 3.87 | n5 = 1.80518 | v5 = 25.4 |
| r11 = 1357.873 | d11 = 0.97 | | |
| r12 = −119.266 | d12 = 4.93 | n6 = 1.88300 | v6 = 40.8 |
| r13 = −30.487 | d13 = 0.15 | | |
| r14 = 138.664 | d14 = 5.75 | n7 = 1.88300 | v7 = 40.8 |
| r15 = −47.991 | | | |

Aspherical Phase Coefficients of Diffracting Plane $C1 = -6.5040 \times 10^{-4}$ $C2 = 1.3974 \times 10^{-6}$ $C3 = -3.6305 \times 10^{-9}$ $C4 = -9.2017 \times 10^{-12}$ Refractive Power of Diffracting Plane $Pd = 0.0013081$ $Pd \cdot f = 0.0673$

[Numerical Example 2]

| | | | |
|---|---|---|---|
| f = 51.750 | $F_{NO}$ = 1.460 | 2ω = 45.32° | |
| r1 = 63.670 | d1 = 4.23 | n1 = 1.88500 | v1 = 41.0 |
| r2 = 480.047 | d2 = 0.20 | | |
| r3 = 29.134 | d3 = 4.23 | n2 = 1.88500 | v2 = 41.0 |
| r4 = 45.244 | d4 = 1.10 | | |
| r5 = 74.108 | d5 = 3.11 | n3 = 1.66807 | v3 = 30.5 |
| r6 = 21.843 | d6 = 9.74 | | |
| r7 = 0.000 (stop) | d7 = 2.01 | | |
| r8 = 359.627 | d8 = 1.99 | n4 = 1.51633 | v4 = 64.2 |
| r9 = 0.000 (diffracting plane) | d9 = 3.59 | | |
| r10 = −22.913 | d10 = 4.99 | n5 = 1.79135 | v5 = 24.7 |
| r11 = 873.410 | d11 = 1.07 | | |
| r12 = −115.861 | d12 = 4.56 | n6 = 1.88500 | v6 = 41.0 |
| r13 = −32.528 | d13 = 0.15 | | |
| r14 = 129.604 | d14 = 4.85 | n7 = 1.87793 | v7 = 41.4 |
| r15 = −49.846 | | | |

Aspherical Phase Coefficients of Diffracting Plane $C1 = -5.0835 \times 10^{-4}$ $C2 = 1.3284 \times 10^{-6}$ $C3 = -3.8661 \times 10^{-9}$ Refractive Power of Diffracting Plane $Pd = 0.0010167$ $Pd \cdot f = 0.0526$

[Numerical Example 3]

| | | | |
|---|---|---|---|
| f = 51.750 | $F_{NO}$ = 1.456 | 2ω = 45.32° | |
| r1 = 64.531 | d1 = 4.20 | n1 = 1.80400 | v1 = 46.6 |
| r2 = 675.667 | d2 = 1.23 | | |
| r3 = 29.606 | d3 = 3.85 | n2 = 1.83481 | v2 = 42.7 |
| r4 = 48.153 | d4 = 3.12 | | |
| r5 = 81.046 | d5 = 2.10 | n3 = 1.64769 | v3 = 33.8 |
| r6 = 22.987 | d6 = 5.10 | | |
| r7 = 0.000 | d7 = 1.80 | n4 = 1.51633 | v4 = 64.2 |
| r8 = 0.000 (diffracting plane) | d8 = 1.25 | | |
| r9 = 0.000 (stop) | d9 = 6.13 | | |
| r10 = −22.247 | d10 = 3.13 | n5 = 1.76182 | v5 = 26.5 |
| r11 = 926.894 | d11 = 0.97 | | |
| r12 = −115.227 | d12 = 5.46 | n6 = 1.88300 | v6 = 40.8 |
| r13 = −30.728 | d13 = 0.15 | | |
| r14 = 96.450 | d14 = 4.90 | n7 = 1.80400 | v7 = 46.6 |
| r15 = −52.498 | | | |

Aspherical Phase Coefficients of Diffracting Plane $C1 = -5.7211 \times 10^{-4}$ $C2 = 1.4279 \times 10^{-6}$ $C3 = -4.0203 \times 10^{-9}$ Refractive Power of Diffracting Plane $Pd = 0.0011442$ $Pd \cdot f = 0.0592$

[Numerical Example 4]

| | | | |
|---|---|---|---|
| f = 51.750 | $F_{NO}$ = 1.460 | 2ω = 45.32° | |
| r1 = 57.399 | d1 = 4.19 | n1 = 1.87276 | v1 = 32.4 |
| r2 = 167.181 | d2 = 3.99 | | |
| r3 = 25.901 | d3 = 3.97 | n2 = 1.88500 | v2 = 41.0 |
| r4 = 37.242 | d4 = 1.47 | | |
| r5 = 67.547 | d5 = 2.10 | n3 = 1.77108 | v3 = 25.3 |
| r6 = 21.070 | d6 = 5.51 | | |
| r7 = 157.333 | d7 = 1.80 | n4 = 1.51633 | v4 = 64.2 |
| r8 = 0.000 (diffracting plane) | d8 = 1.25 | | |
| r9 = 0.000 (stop) | d9 = 6.89 | | |
| r10 = −19.999 | d10 = 2.10 | n5 = 1.76043 | v5 = 25.7 |
| r11 = −343.282 | d11 = 1.01 | | |
| r12 = −83.139 | d12 = 4.76 | n6 = 1.88500 | v6 = 41.0 |
| r13 = −28.339 | d13 = 0.15 | | |
| r14 = 178.251 | d14 = 4.90 | n7 = 1.88500 | v7 = 41.0 |
| r15 = −43.618 | | | |

Aspherical Phase Coefficients of Diffracting Plane $C1 = -4.7630 \times 10^{-4}$ $C2 = 1.3915 \times 10^{-6}$ $C3 = -4.5654 \times 10^{-9}$ Refractive Power of Diffracting Plane $Pd = 0.0009526$ $Pd \cdot f = 0.0430$ In general, the aspherical surface (of the diffracting plane) is often placed at such a position relatively far from the stop of the optical system that both the axial ray and the abaxial ray from the optical axis pass therethrough at high positions, in order to correct axial and abaxial aberrations well.

However, since an almost symmetrical lens such as a Gaussian lens corrects axial and abaxial aberrations by utilizing symmetry between the object-side lens unit and the image-side lens unit, it is important to correct axial and abaxial aberrations without disturbing the symmetry in order to obtain a good balance of the aberrations. In particular, when the diffracting optical element is incorporated into the photographic optical system, it is necessary to place the diffracting optical plane in consideration of great influence on chromatic aberration after further examination based on the placement of the aspherical surface.

In the almost or substantially symmetrical optical system of the present invention, it is preferable to place the diffracting optical plane adjacent or near the stop. The abaxial ray from the optical axis, in general, passes at a low position through the diffracting optical plane near the stop, and this does not have a direct influence on abaxial aberration, but mainly on spherical aberration and axial chromatic aberration. Therefore, it is possible to correct spherical aberration of the whole system by the diffracting optical plane with little influence on abaxial aberration. Furthermore, since the degree of freedom of aberration correction increases, abaxial aberrations, such as coma and field curvature, can be thereby corrected better by the lenses in front of and behind the stop.

Since axial chromatic aberration can be controlled almost completely, the degree of freedom of correction made to chromatic aberration by the lens units in front of and behind the stop increases, and chromatic aberration of magnification can be also corrected well. Though the conventional optical system including only reflecting lenses as positive lenses in the lens units in front of and behind the stop is disadvantageous in correcting chromatic aberration, a high-dispersion glass, that is, a glass having high refractive index is allowed to be used positively, which makes it possible to correct spherical aberration and field curvature better.

The above description makes it clear that it is preferable to place the diffracting optical plane near the stop particularly in the almost or substantially symmetrical optical system.

As for the formula (1), it is preferable that the following condition be further satisfied:

$$C_1 < 0 \text{ and } C_2 > 0 \quad (2)$$

The above formula (2) represents a condition for good correction of spherical aberration. $C_1 < 0$ means that the paraxial refractive power of the diffraction grating is positive, and $C_2 > 0$ means that the positive refractive power gradually decreases toward the periphery of the diffraction grating. In other words, the diffracting optical plane is allowed, by setting $C_1 < 0$, to cancel an axial chromatic aberration caused in the lens units in front of and behind the stop, at the same time, to share in the positive refractive power of the whole optical system, and to thereby prevent an insufficiently corrected low-order spherical aberration which the lens units in front of and behind the stop substantially exhibit. Similarly, an insufficiently corrected relatively high-order spherical aberration (zonal spherical aberration), which the lens units in front of and behind the stop substantially exhibit, is canceled out by setting $C_2 > 0$.

If the condition formula (2) is not satisfied, spherical aberration and axial chromatic aberration cannot be corrected well.

In order to correct aberrations better, it is preferable to satisfy the following condition:

$$0.02 < Pd \cdot f < 0.4 \quad (3)$$

where f represents the focal length of the whole optical system, and Pd represents the sum of refractive powers of the diffracting optical plane in the second unit.

If the value of the formula (3) falls below the lower limit value and the positive refractive power of the diffracting plane weakens, negative displacement of a low-order spherical aberration in the lens units in front of and behind the stop increases, which is not preferable.

If the value of the formula (3) exceeds the upper limit value and the positive refractive power of the diffracting plane increases, the distribution of the refractive power between the lens units in front of and behind the stop changes, which makes it difficult to keep the aberrations in balance.

The diffracting optical plane may be placed on the object side or image side of the stop which is interposed between the lens units in front of and behind the stop.

Though the optical systems corresponding to Numerical Examples 1 to 4 are so designed that first-order light of the diffracted light is imaged best, it may be designed so that other-order light is imaged best. Whether the diffraction grating formed on the diffracting optical plane is of a kinoform type or a binary type, the optical system is of the present invention may be embodied.

Figure 13:
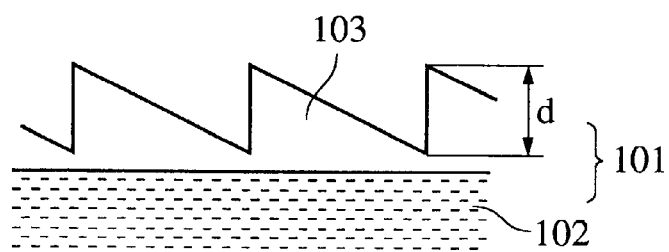
FIG. 13 is a cross-sectional view of a grating of a diffracting optical element of the present invention.

It is assumed that the grating of the diffracting optical element in each of the numeral examples has a kinoform cross section as shown in FIG. 13. In FIG. 13, numeral 101 denotes a diffracting optical element which is composed of a base material 102 and a ring-shaped diffraction grating formed of ultraviolet-curing resin on the surface of the base material 102. The grating thickness d of the ring-shaped diffraction grating 103 in the diffracting optical element 101 shown in FIG. 13 is so set that the first-order diffraction efficiency is 100% with respect to a wavelength of 530 nm.

Figure 14:
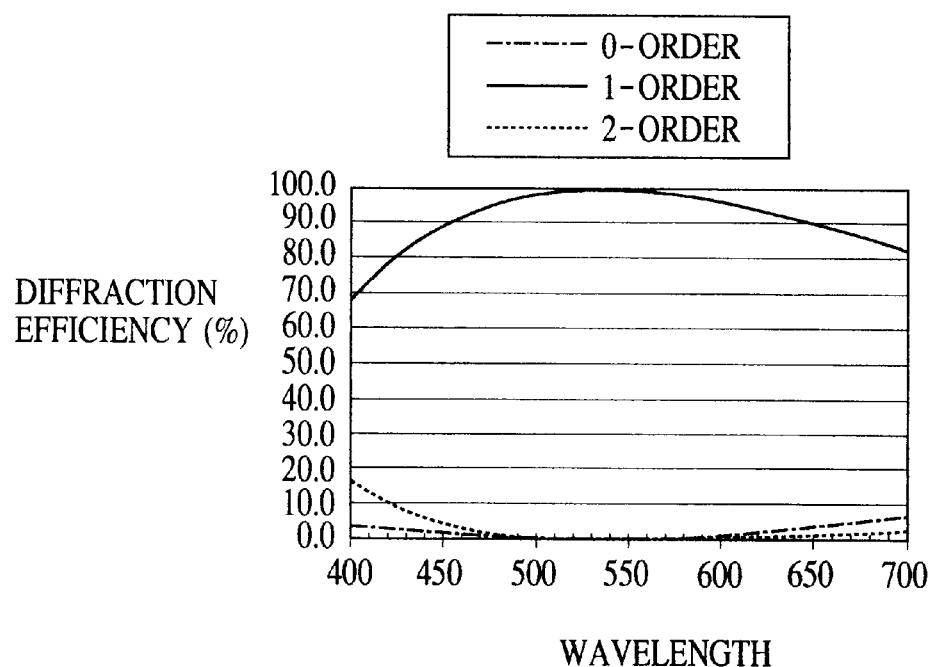
FIG. 14 is a view showing the wavelength-dependent characteristic of first-order diffraction efficiency of the diffracting optical element shown in FIG. 13.

FIG. 14 shows the wavelength-dependent characteristic of the first-order diffraction efficiency of the diffracting optical element in FIG. 13. As FIG. 14 reveals, the designed-order diffraction efficiency decreases as the wavelength becomes apart from the optimum value of 530 nm, while the diffraction efficiencies of diffracted lights of the zero order and the second order, which approximate to the designed order, increase, since the diffracted lights of orders other than the designed order cause flare, which lowers the resolution of the optical system.

Figure 15:
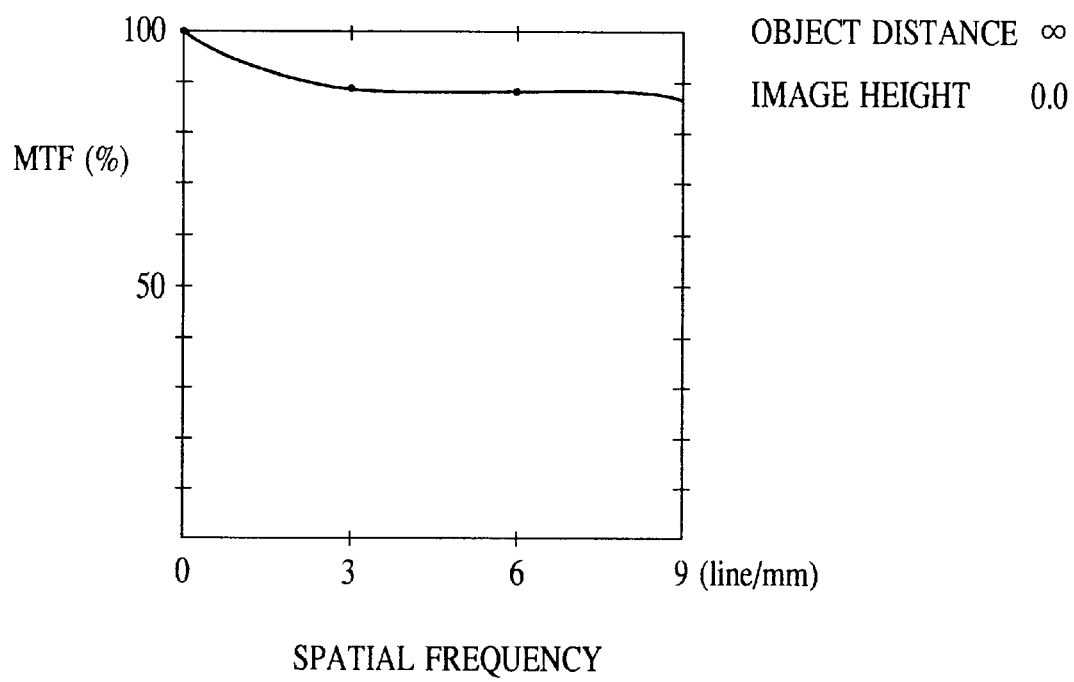
FIG. 15 is a view showing the MTF (Modulation Transfer Function) characteristic of an optical system including the diffracting optical element of FIG. 13 with respect to the spatial frequency.

FIG. 15 shows the MTF characteristic of the optical system corresponding to Numerical Example 1 with respect to the spatial frequency in a case of photographing by using a general monochrome film and a light source emitting C-line light in which the diffraction grating of the diffracting optical element has a cross section shown in FIG. 13. FIG. 15 reveals that MTF in the low-frequency region is smaller than the desired value.

Next, a diffracting optical element having a multilayer grating shown in FIG. 16 will be described. Specifically, a first diffraction grating 104 made of an ultraviolet-curing resin (nd=1.499, υd=54) is formed on a base material 102, and a second diffraction grating 105 made of another ultraviolet-curing resin (nd=1.598, υd=28) is further formed thereon. In this combination of the materials, the grating thickness d1 of the first diffraction grating is 13.8 μm, and the grating thickness d2 of the second diffraction grating is 10.5 μm.

Figure 16:
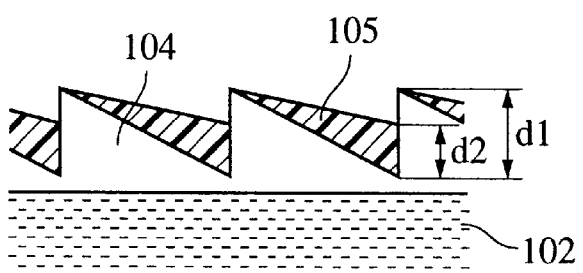
FIG. 16 is a cross-sectional view of a grating of a multilayer diffracting optical element of the present invention.
Figure 17:
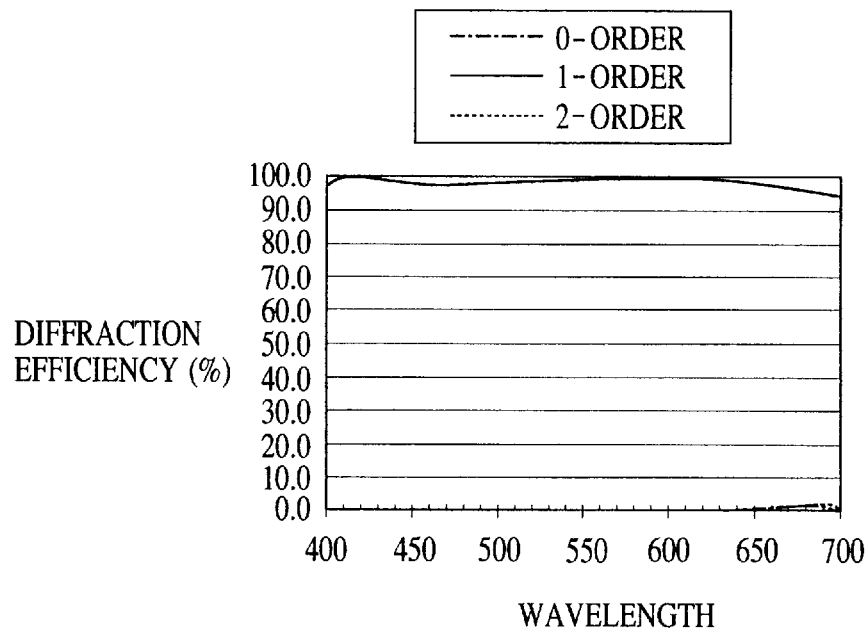
FIG. 17 is a view showing the wavelength-dependent characteristic of first-order diffraction efficiency of the diffracting optical element shown in FIG. 16.

FIG. 17 shows the wavelength-dependent characteristic of the first-order diffraction efficiency of the diffracting optical element shown in FIG. 16. As FIG. 17 reveals, the diffraction efficiency of the designed order is made high, more than 95%, over all of the used wavelength regions by employing the multilayer diffraction grating.

Figure 18:
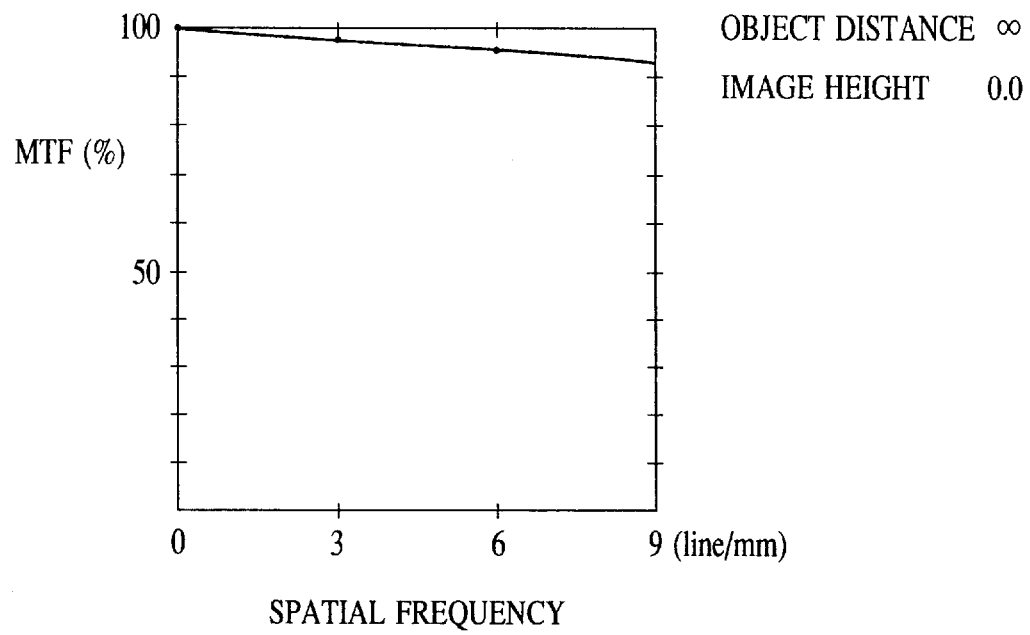
FIG. 18 is a view showing the MTF characteristic of an optical system including the diffracting optical element of FIG. 16 with respect to the spatial frequency.

FIG. 18 shows the MTF characteristic of the optical system corresponding to Numerical Example 1 with respect to the spatial frequency in a case of photographing by using a general monochrome film and a light source emitting C-line light in which the diffraction grating of the diffracting optical element has a cross section shown in FIG. 16. The MTF of the low-frequency region is improved and the desired MTF characteristic is obtained by using the multilayer diffraction grating. In this way, optical performance is further improved by using the multilayer diffraction grating as a diffracting optical element.

Figure 19:
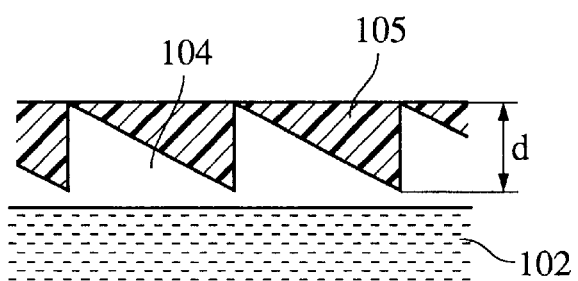
FIG. 19 is a cross-sectional view of another type of grating in the multilayer diffracting optical element of the present invention.

The material of the above-mentioned multilayer diffraction grating is not limited to ultraviolet-curing resin, but other plastic materials may be used. The first diffraction grating 104 may be directly formed as the base material depending on the material thereof. Furthermore, the gratings are not always required to be different in thickness, and they may be equal in thickness as shown in FIG. 19 depending on the combination of materials thereof. In this case, since no grating shape appears on the surface of the diffracting optical element, dustproofness and assembly efficiency of the diffracting optical element are improved, which makes it possible to provide a less expensive optical system.

Even if the optical system of the present invention is embodied by a reflecting optical unit in addition to the refracting optical unit and the diffracting optical unit, the same advantages are obtained without departing from the spirit of the present invention.

Figure 20:
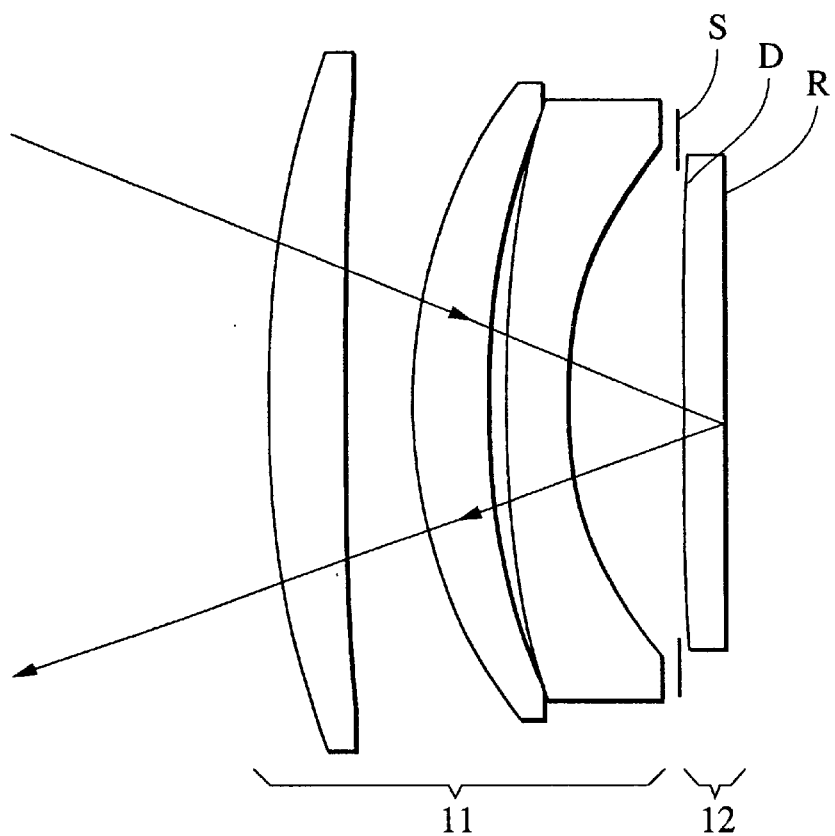
FIG. 20 is a view of an optical system having a reflecting optical unit according to an embodiment of the present invention.

FIG. 20 shows an optical system using a reflecting optical unit according to the present invention. In FIG. 20, the optical system is composed of a refracting optical unit 11 serving as both first and third units and a diffracting optical unit 12 serving as a second unit. The first plane of the second unit 12 is a diffracting optical plane D, and the last plane of the second unit 12 is a reflecting plane R, and light from the object travels as shown by the arrow in FIG. 20 and forms an image. In other words, the second unit 12 serves as both a diffracting optical unit and a reflecting optical unit.

As can be seen from FIG. 20, light from the object passes through the refracting optical unit 11 (and through the stop S), through the diffraction optical plane D of the optical unit 12, and is reflected by the reflecting plane R of the optical unit 12, and back through the refracting optical unit 11 in the opposite direction.

Figure 21:
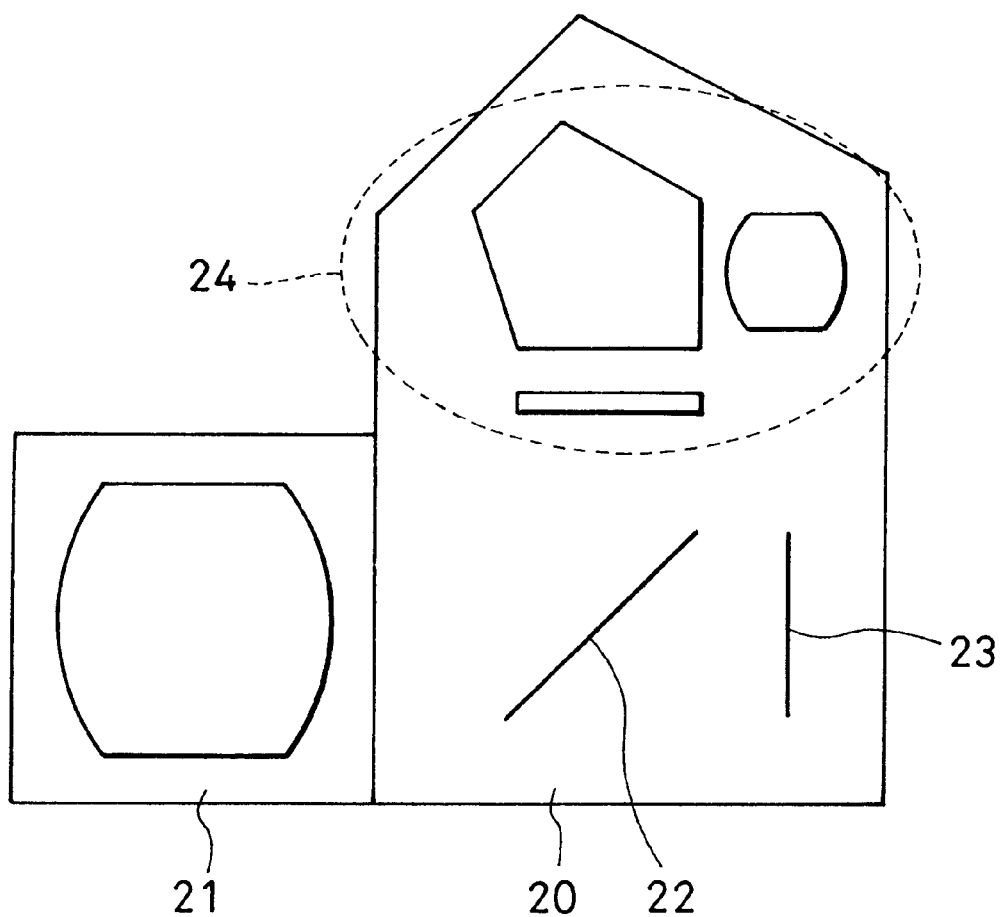
FIG. 21 is a schematic view of the principal part of a camera having the optical system of the present invention.

FIG. 21 shows a camera to which the optical system of the present invention is applied.

In FIG. 21, the camera comprises a main body 20, a photographic optical system 21, which is composed of the optical system of the present invention, a movable mirror 22, a film plane 23, and a finder optical system 24.

As can be seen from FIG. 21, light from the object passes through the photographic optical system 21, to the movable mirror 22, and through the finder optical system 24, to be observed by an observer.

Such an application of the optical system of the invention to an optical instrument such as a camera makes it possible to provide an optical instrument well corrected for aberrations.

Except as otherwise disclosed herein, the various components shown in outline or in block form in the figures are individually well-known and their internal construction and operation are not critical either to the making or using of this invention or to a description of the best mode of the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical system having a stop, said optical system comprising:
   a first refracting optical unit placed on the object side with respect to the stop;
   a diffracting optical unit placed adjacent the stop to correct chromatic aberration; and
   a second refracting optical unit placed on the image side with respect to the stop,
   wherein said first refracting optical unit and said second refracting optical unit are substantially symmetrical with respect to the stop.

2. An optical system according to claim 1, wherein each of said first and second refracting optical units includes at least one positive lens and at least one negative lens, said negative lens being placed at a closer position to the stop than said positive lens and having a strong concave plane pointed toward the stop.

3. An optical system according to claim 1, wherein said diffracting optical unit includes a diffracting optical plane having a lower refractive power than a refractive power of said optical system as a whole.

4. An optical system according to claim 3, wherein said diffracting optical plane is a diffraction grating which is rotationally symmetric with respect to an optical axis of said optical system, and
   wherein the conditions C1<0 and C2>0 are satisfied, when a phase $\phi(h)$ of said diffraction grating is given by the following formula:

$$\phi(h)=(2\pi/\gamma)(C1 \cdot h^2+C2 \cdot h^4+C3 \cdot h^6+ \ldots +Ci \cdot h^{2i})$$

where $\gamma$ represents the wavelength, Ci represents the aspherical phase coefficient, and h represents the height from the optical axis.

5. An optical system according to claim 3, satisfying the following condition:

$$0.02 < Pd \cdot f < 0.4$$

where Pd represents a sum of refractive powers of said diffracting optical plane, and f represents a focal length of said optical system as a whole.

6. An optical system according to claim 1, wherein said diffracting optical unit comprises:
   a first ring-shaped diffraction grating; and
   a second ring-shaped diffraction grating formed on said first ring-shaped diffraction grating,
   wherein said first and second ring-shaped diffraction gratings are made of different materials.

7. An optical system according to claim 6, wherein said first and second ring-shaped diffraction gratings are equal in grating thickness.

8. An optical system according to claim 1, wherein said diffracting optical unit is disposed on the object side of the stop.

9. An optical system according to claim 1, wherein said diffracting optical unit is disposed on the image side of the stop.

10. An optical system having a stop, said optical system comprising:
    a refracting optical unit placed on the object side with respect to the stop;
    a diffracting optical unit placed adjacent said stop to correct chromatic aberration; and
    a reflecting optical unit disposed on the image side of said diffracting optical unit,
    wherein light from the object travels through said refracting optical unit, said diffracting optical unit, said reflecting optical unit, and said refracting optical unit again, in this order.

11. An optical system according to claim 10, wherein said refracting optical unit comprises, in order from the object side to the image side, a positive lens and a negative lens having a strong concave surface toward the stop.

12. An optical system according to claim 10, wherein light from the object travels through said refracting optical unit and said diffracting optical unit, and is reflected from said reflecting optical unit back through said diffracting optical unit, and said refracting optical unit, in this order.

13. An optical unit according to claim 10, wherein said diffracting optical unit and said reflecting optical unit are disposed, in that order, on the image side of the stop.

14. An optical system comprising:
    a refracting optical unit;
    a stop; and
    an optical unit having a diffracting optical plane on the image side surface thereof and a reflecting optical plane on the object side surface thereof, wherein light from an object passes, in order, through said refracting optical unit, said stop, and said diffracting optical plane, and is reflected by said reflecting optical plane back through said diffracting optical plane, said stop, and said refracting optical unit, in that order.

15. An optical system according to claim 14, wherein said refracting optical unit comprises a positive lens and, closer to the stop than said positive lens, a negative lens having a strong concave surface toward the stop, and wherein the light from the object passes through said positive lens and said negative lens in that order before being reflected by said reflecting optical plane back through said negative lens and said positive lens in that order.

16. An optical system according to claim 14, wherein said diffracting optical plane is a diffraction grating which is rotationally symmetric with respect to an optical axis of said optical system, and wherein the conditions C1<0 and C2>0 are satisfied, when a phase $\phi(h)$ of said diffraction grating is given by the following formula:

$$\phi(h) = (2\pi/\gamma)(C1 \cdot h^2 + C2 \cdot h^4 + C3 \cdot h^6 + \ldots + Ci \cdot h^{2i})$$

where $\gamma$ represents the wavelength, Ci represents the aspherical phase coefficient, and h represents the height from the optical axis.

17. An optical instrument comprising:

an objective optical system, said objective optical system including a stop, a first refracting optical unit placed on the object side with respect to said stop, a diffracting optical unit placed adjacent said stop to correct chromatic aberration, and a second refracting optical unit placed on the image side with respect to said stop, wherein said first and second refracting optical units are substantially symmetrical with respect to said stop; and an observation optical system for guiding light, taken from the object by said objective optical system, to be observed.

18. An optical instrument according to claim 17, wherein said optical instrument is a camera.

19. An optical instrument according to claim 17, wherein said diffracting optical unit comprises a diffraction grating which is rotationally symmetric with respect to an optical axis of said optical system, and wherein the conditions C1<0 and C2>0 are satisfied, when a phase $\phi(h)$ of said diffraction grating is given by the following formula:

$$\phi(h) = (2\pi/\gamma)(C1 \cdot h^2 + C2 \cdot h^4 + C3 \cdot h^6 + \ldots + Ci \cdot h^{2i})$$

where $\gamma$ represents the wavelength, Ci represents the aspherical phase coefficient, and h represents the height from the optical axis.

20. An optical instrument according to claim 17, wherein said diffracting optical unit comprises:

a first ring-shaped diffraction grating; and a second ring-shaped diffraction grating formed on said first ring-shaped diffraction grating, wherein said first and second ring-shaped diffraction gratings are made of different materials.

\* \* \* \* \*

UNITED STATES PATENT AND TRADEMARK OFFICE
CERTIFICATE OF CORRECTION

PATENT NO.    : 5,930,043
DATED         : July 27, 1999
INVENTOR(S)   : Hideki Ogawa It is certified that error appears in the above-identified patent and that said Letters Patent is hereby corrected as shown below:

Column 4,
Line 27, "Y" should read -- $\lambda$ --.

Line 29, "Y" should read -- $\lambda$ --.

Line 58, "Y" should read -- $\lambda$ --.

Column 7,
Line 59, "system is" should read -- system --.

Column 10,
Line 4, "$\Phi$ (h)" should read -- function $\Phi$ (h) --.
Line 8, "Y" should read -- $\lambda$ --.

Line 9, "Y" should read -- $\lambda$ --; and "Ci represents the" should read --

C1, C2, and C3 represent the first, second, and third aspherical phase coefficients, and i is an integer greater than 3, wherein Ci is the ith aspherical phase coefficient, --.
Line 10, "aspherical phase coefficient," should be deleted.

UNITED STATES PATENT AND TRADEMARK OFFICE
CERTIFICATE OF CORRECTION

PATENT NO.    : 5,930,043
DATED         : July 27, 1999
INVENTOR(S)   : Hideki Ogawa It is certified that error appears in the above-identified patent and that said Letters Patent is hereby corrected as shown below:

Column 11,
Line 21, "Φ(h)" should read -- function Φ (h) --.
Line 25, "Y" should read --λ --.
Line 27, "Y" should read --λ --; and "Ci represents the" should read --
C1, C2, and C3, represent the first, second, and third aspherical phase coefficients, and i is an integer greater than 3, wherein Ci is the ith aspherical phase coefficient, --.
Line 28, "aspherical phase coefficient", should be deleted.

Column 12,
Line 16, "Φ(h)" should read -- function Φ (h) --.
Line 20, "Y" should read -- λ --.
Line 21, "Y" should read -- λ --; and "Ci represents the" should read --
C1, C2, and C3 represent the first, second, and third aspherical phase coefficients, and i is an integer greater than 3, wherein Ci is the ith aspherical phase coefficient, --.
Line 22, "aspherical phase coefficient," should be deleted.

Signed and Sealed this

Twenty fifth Day of September, 2001

*Attest:*

NICHOLAS P. GODICI
*Attesting Officer*    Acting Director of the United States Patent and Trademark Office